United States Patent [19]

Izumi et al.

[11] Patent Number: 4,948,401
[45] Date of Patent: Aug. 14, 1990

[54] GAS MIXTURE SEPARATOR UTILIZING PRESSURE MODULATION

[75] Inventors: Jun Izumi, Nagasaki; Seiichi Tanabe; Kazuaki Ohshima, both of Tokyo, all of Japan

[73] Assignee: Mitsubishi Jukogyo Kabushiki Kaisha, Tokyo, Japan

[21] Appl. No.: 243,040

[22] PCT Filed: Dec. 7, 1987

[86] PCT No.: PCT/JP87/00944
§ 371 Date: Aug. 1, 1988
§ 102(e) Date: Aug. 1, 1988

[87] PCT Pub. No.: WO88/04195
PCT Pub. Date: Jun. 16, 1988

[30] Foreign Application Priority Data
Dec. 8, 1986 [JP] Japan .................. 61-292038

[51] Int. Cl.⁵ ............................... B01D 53/04
[52] U.S. Cl. ............................ 55/180; 55/387
[58] Field of Search ............. 55/25, 26, 58, 179, 55/387, 398, 180

[56] References Cited

U.S. PATENT DOCUMENTS 3,121,625  2/1964  Broughton ............... 55/58
3,164,454  1/1965  Wilson ..................... 55/75
4,354,859  10/1983 Keller et al. .............. 55/25
4,702,903  10/1987 Keefer ...................... 55/68 X

FOREIGN PATENT DOCUMENTS 0030322  2/1983  Japan.
0097019  5/1985  Japan.

Primary Examiner—Bernard Nozick
Attorney, Agent, or Firm—Fleit, Jacobson, Cohn, Price, Holman & Stern

[57] ABSTRACT

A gas mixture separator having adsorbent (1) with pressure dependent adsorptivity includes a cylinder (2) and a piston (3) as a means of pressure modulation necessary for the adsorption and desorption of gas components to be separated. Ingredient gas to be separated is fed to the cylinder through an inlet valve and inlet (5) to flow into contact with the adsorbent (1) by pressure produced by the piston (3) moving toward top dead center in the cylinder (2). The unadsorbed gas component passes through the adsorbent and exits the cylinder through the outlet (4) and associated outlet valve. The adsorbed gas component is desorbed during depressurization of the cylinder (2) during the retraction stroke of the piston (3) and exits through the outlets (8, 6) therefore. Adsorbed gas is introduced into the cylinder (2) through an inlet (7) therefrom from an additional separator for recovery of energy therefrom. A plurality of separators having the same construction (11a, b, c, d), are connected in a cascade arrangement for more economical operation with the adsorbed gas outlets (8 a, b, c, d) connected to adsorbed gas inlets (7a, b, c, d) of other separators. Along with a size reduction and a shortened operational period, a large reduction in power consumption and equipment cost becomes possible.

4 Claims, 4 Drawing Sheets

GAS MIXTURE SEPARATOR UTILIZING PRESSURE MODULATION

BACKGROUND OF THE INVENTION

The present invention relates to a gas mixture separator utilizing pressure modulation which is used, for example, in a fuel power plant and uses adsorbent that has pressure dependent adsorptivity, such as zeolite.

The typical prior examples of gas mixture separators utilizing pressure modulation (referred to as PSA hereafter) are disclosed in Japanese Patent Publication No. 20082/1970, Japanese Patent Provisional Publication No. 14070/1972, and Japanese Patent Provisional Publication No. 16874/1973. In any of the above prior art references, gases are separated from a mixture by: pressurizing an ingredient gas mixture with a suitable means, normally a gas compressor, to a certain pressure; then leading the mixture into adsorption towers that contain an adsorbent through valves; and repeating, for example, the following cycle:

(1) A supply gas is fed through a supply inlet, and part of the product gas is fed through an outlet to equalize the pressure.

(2) The supply gas continues to be fed to pressurize further.

(3) Part of the product gas is fed into another tower, and the pressure is equalized.

(4) Through parallel current depressurization, part of the product gas is used to purge another tower.

(5) With counter current depressurization the desorption of adsorbed components is carried out.

(6) The purge is received from an outlet.

TABLE 1.

| Time from the beginning of each cycle (sec.) | Adsorption towers | | |
| --- | --- | --- | --- |
| | No. 1 | No. 2 | No. 3 |
| 0-15 | Repressurization | Counter current depressurization | Pressure equalization (I) |
| 15-35 | Repressurization | Discharge | Parallel current depressurization |
| 35-40 | Repressurization | Repressurization | Pressure equalization (II) |
| 40-55 | Pressure equalization (I) | Repressurization | Counter current depressurization |
| 55-75 | Parrallel current depressurization | Repressurization | Discharge |
| 75-80 | Pressure equalization (II) | Repressurization | Repressurization |
| 80-95 | Counter current depressurization | Pressure equalization (I) | Repressurization |
| 95-115 | Discharge | Parrallel current depressurization | Repressurization |
| 115-120 | Repressurization | Pressure equalization (II) | Repressurization |

FIG. 4 shows, as an example, an air separator utilizing an adsorption method that is used to separate the air into oxygen and nitrogen. According to this, after dust is removed from the air using an air filter 26, the air is pressurized to about 5 Kg/cm² by an air compressor 27c, and the heat of compression is removed by a water cooler 28. Water is then removed by a water separator 29, and the air is led into adsorption towers 19a-19d.

The adsorption towers 19a-19d contain adsorbent 20a-20d, respectively, that is made of zeolite or the like having a filtering function. Of the air fed through valves 24a-24d, only the product gas component passes through the adsorbent 20a-20d and is led into a product gas holder 21 through valves 24e-24h.

Since a large amount of the air, compared with the adsorptivity of the adsorbent 20a-20d, is fed, it is necessary to desorb by depressurization in order to recover adsorptivity, followed by discharge of the waste air through valves 24i-24l.

Thus, to supply the product gas continuously, it is necessary to carry out adsorption under high pressure and desorption under low pressure periodically, and this requires at least two adsorption towers. Here, an example with 4 towers is shown. Also, 24m-24q in FIG. 4 are pressure equalization valves. The valves 24a-24q are controlled by a controller 22 to ensure smooth adsorption and desorption.

In order to make the air separator of FIG. 4 more economical, a cost reduction in equipment and in operation has to be achieved through a size reduction and an increase in operational efficiency.

To reduce equipment costs a reduction in time per cycle would be effective, and to achieve a higher efficiency a reduction in required power during pressurization and depressurization processes would be desirable.

However, according to the prior art, the pressure modulation required for the operational cycle of the adsorbent 20a-20d is achieved by pressurization up to a certain pressure and then by opening and closing of a plurality of valves 24a-24l at the inlets and outlets of the adsorption towers 19a-19d. At the beginning of an adsorption process pressure energy does not do any work, and after the completion of an adsorption process the adsorbed gas expands and its compression energy is released and lost. Thus, a large amount of power is inevitably required, and the period per cycle is commonly 1-5 min. It is easy to slow the process, but it is difficult to shorten the period per cycle due to problems associated with the durability and operational speed of the valves 24a-24l. A further reduction of the period incurs enormous costs and has been virtually impossible.

BRIEF SUMMARY OF THE INVENTION

It is therefore the object of the present invention to provide a gas mixture separator utilizing pressure modulation that is economically superior to the prior devices and makes possible a large reduction in power consumption.

To achieve the above object the present invention provides a gas mixture separator in which the gas pressure in cylinders is modulated by motion of pistons in said cylinders, whereby said separator is characterized in that adsorbent with pressure dependent adsorptivity is disposed between the heads of said cylinders and said pistons.

According to the above construction, the pressurization energy formerly required in the beginning of the adsorption process and the depressurization energy formerly wasted during the desorption process are mechanically recycled. Hence, the power consumption is greatly reduced, and the cost of equipment is also reduced.

The invention will now be described with reference to the accompanying drawings, wherein:

DETAILED DESCRIPTION

In the following description of the FIG. 1 embodiment 1 denotes adsorbent, 2 a cylinder, 3 a piston, 4–8 gas inlets, 11 piston type adsorption towers, 12 a motor for driving the pistons, 13 a crank shaft, and 14–17 valves.

Figure 1:
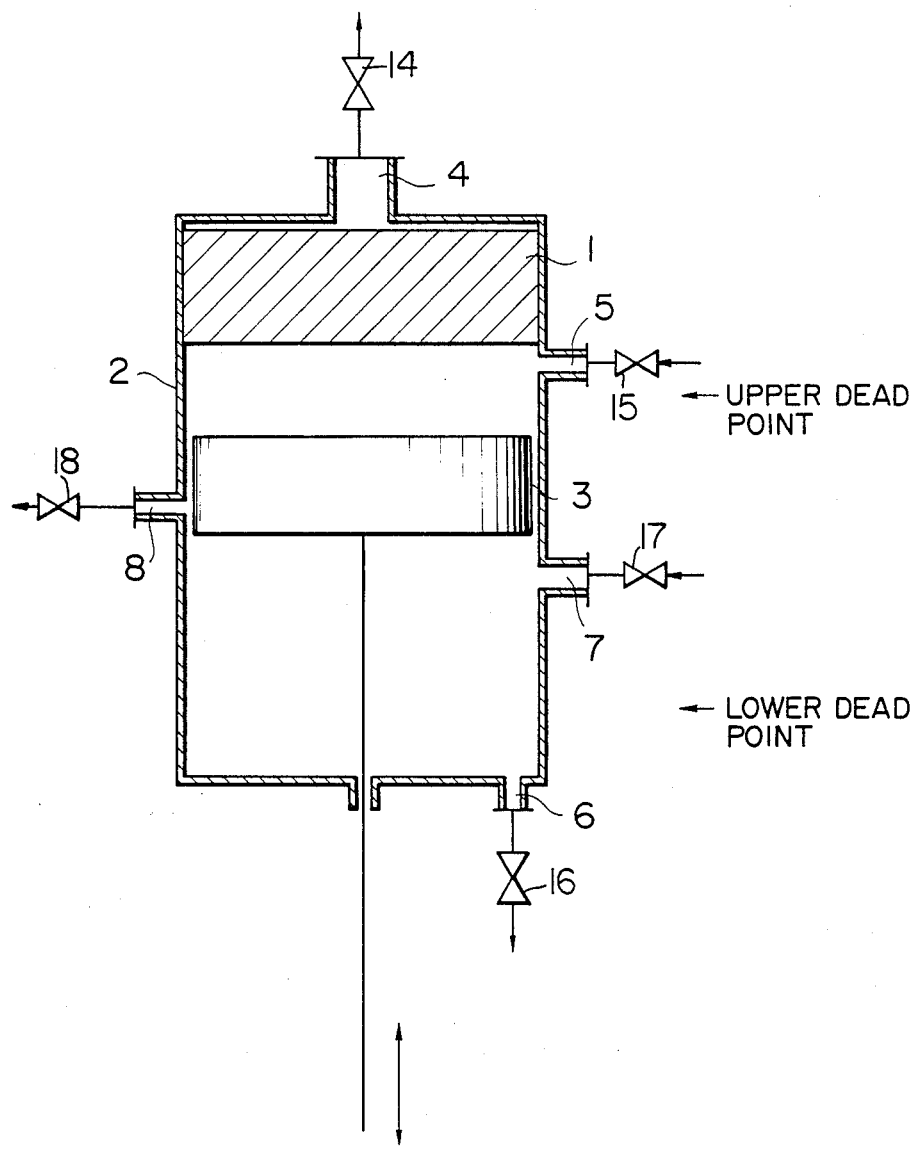
FIGS. 1 and 2 show diagrams of an embodiment of the gas mixture separator utilizing pressure modulation of the present invention.
Figure 2:
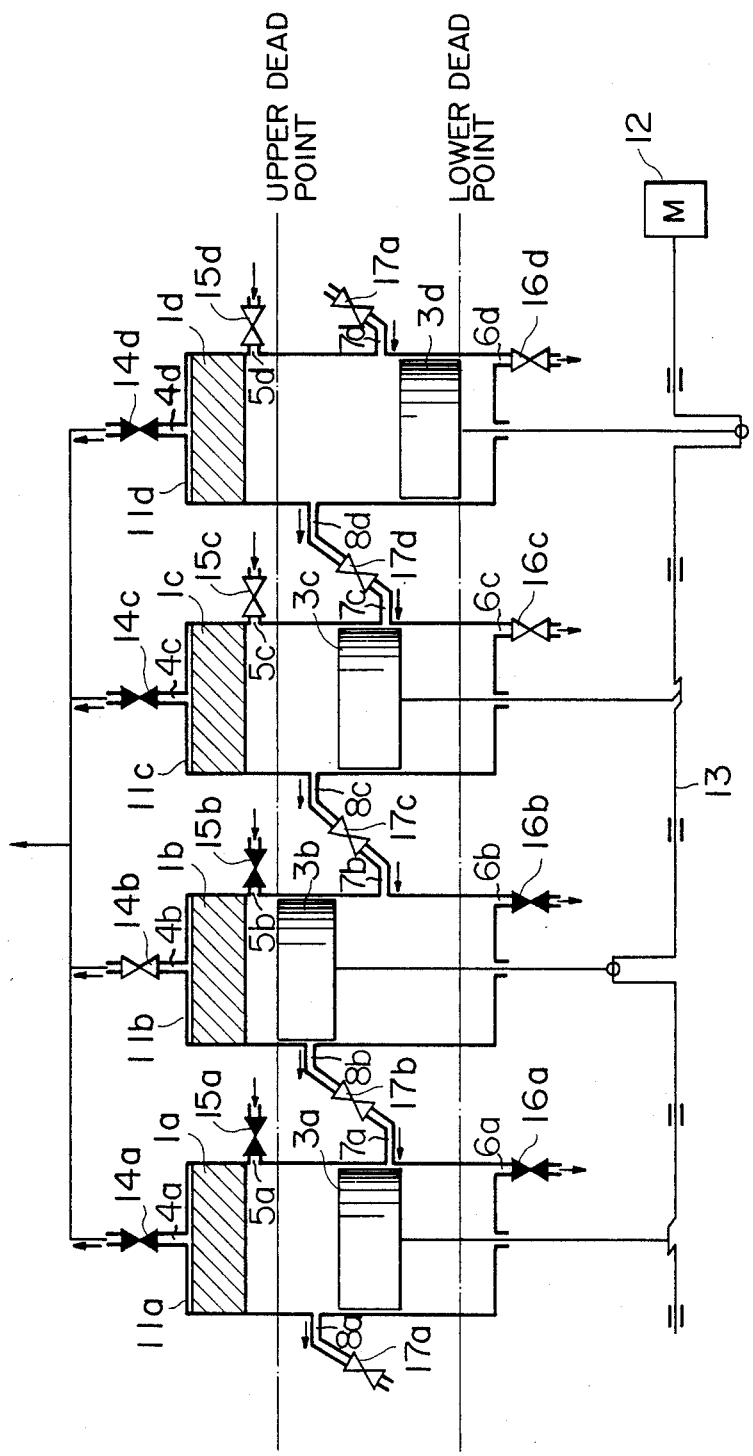
Figure 4:
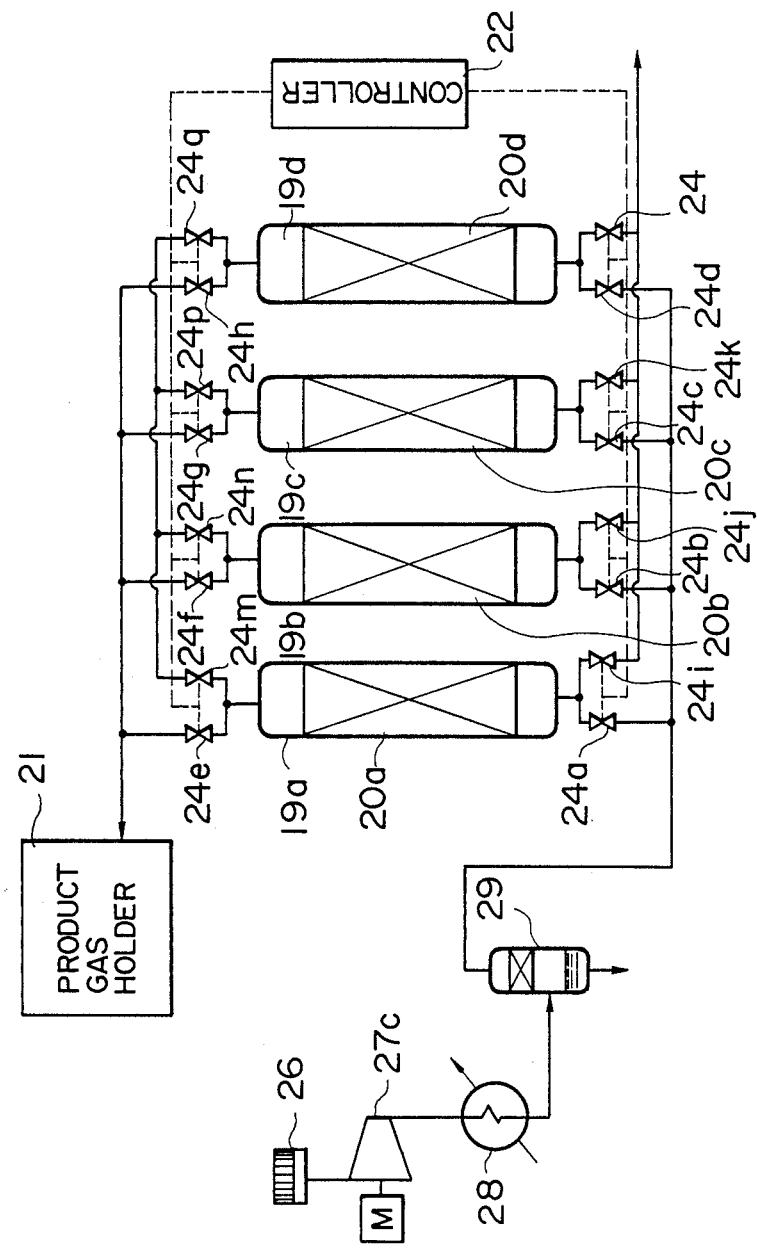
FIG. 4 shows a diagram of a prior art device.

FIGS. 1 and 2 show diagrams for a gas mixture separator utilizing pressure modulation of the present invention. In FIG. 1 adsorbent 1 is disposed between the upper end of a cylinder 2 (i.e., the head of a cylinder 2) and a piston 3, and pressure modulation is obtained through the back and forth reciprocating motion of a piston 3. Gas inlets and outlets 4 to 8 are placed in the cylinder 2 and play the following roles: 4 is an outlet for the unadsorbed gas component and has an associated outlet valve 14, 5 an inlet for the ingredient gas with associated inlet valve 15, 6 an outlet for the adsorbed gas component with associated outlet valve, 7 an inlet for the adsorbed gas component with associated inlet valve 17, and 8 an outlet for the adsorbed gas component with associated outlet valve 18. In this construction, the air compressor 27 and the pressure controlling valves 24a–24l at the inlets and outlets of the adsorption towers 19a–19d, which appear in the prior art apparatus as shown in FIG. 4, are removed.

FIG. 2 shows a parallel array of four adsorption towers of the gas mixture separator utilizing pressure modulation shown in FIG. 1, and they are staggered by a quarter of the period of a cycle in operational timing. In FIG. 2, 4a, b, c, d correspond to outlet 4 of FIG. 1; 5a, b, c, d correspond to inlet 5; 6a, b, c, d correspond to outlet 6; 7a, b, c, d correspond to inlet 7; 8a, b, c, d correspond to outlet 8; 11a, b, c, d denotes piston type adsorption towers; 12 an electric motor or the like for driving the pistons; 13 an crank shaft; 14a, b, c, d valves located in the unadsorbed gas exhaust system; 15a, b, c, d valves located in the ingredient gas inlet system; 16a, b, c, d valves located in the adsorbed gas exhaust system; and 17a, b, c, d valves located in the adsorbed gas transfer system; and a, b, c and d denote each of the four towers staggered by a quarter of the cycle time in its operational cycle. Valve 18 of FIG. 1 is shown in FIG. 2 as 17a.

Figure 3:
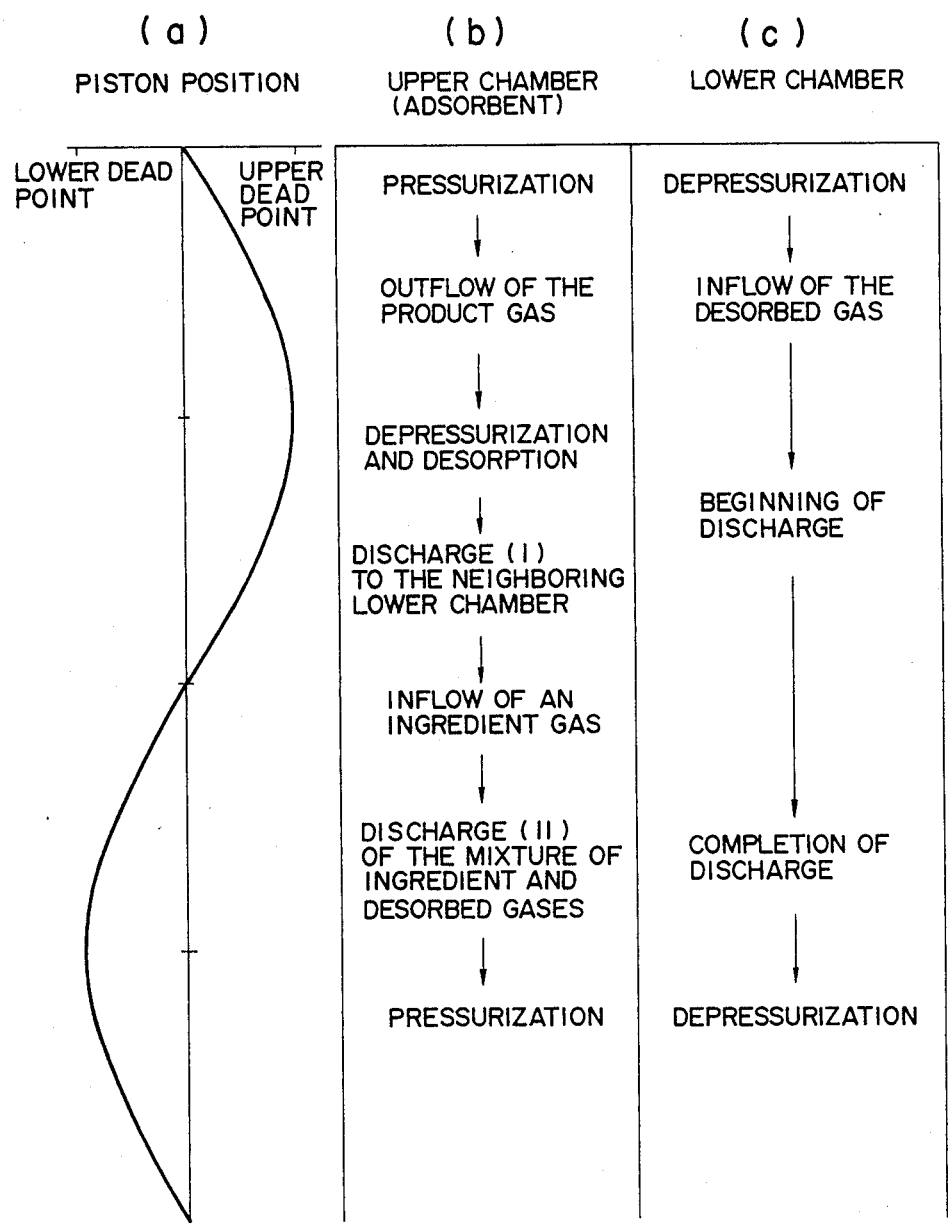
FIG. 3 is a time chart explaining the operation of the embodiment of FIG. 2.

Furthermore, the time chart of FIG. 3 shows the operation of the gas mixture separator utilizing pressure modulation thus constructed. At the time shown in FIG. 3 when the upper chamber is pressurized and the lower chamber is depressurized again, the operational situation is as shown by the leftmost gas mixture separator tower in FIG. 2, denoted by subscript a. In this case, a piston 3 during the forward stroke is in the central position, while valves 14a, 15a and 16a are closed and valves 17a, 17b are open. From this situation the piston 3a is moved toward upper dead center by a motor 12 for driving the pistons. The second tower from the left, denoted by subscript b, shows the situation in which the piston 3b has reached upper dead center after driving out the product, or unadsorbed, gas through outlet 4b. Here, only valves 15b and 16b are closed, other valves 14b, 17b, 17c are open. Similarly, the situation of depressurization and desorption in FIG. 3 corresponds to the third tower from the left denoted by subscript c in FIG. 2, and the discharged situation in FIG. 3 corresponds to the rightmost tower denoted by subscript d in FIG. 2. The above operation is repeated continuously for the subsequent cycles.

According to the embodiment of the present invention explained above, the following effects are obtained:

(1) The pressurization energy formerly required at the beginning of the adsorption process and the depressurization energy formerly wasted during the desorption process are mechanically recycled. Hence, the power consumption is greatly reduced (about 5–30%), and the cost of equipment is also reduced.

(2) The period of a cycle can be vastly shortened, for example, from 60 sec. formerly to 0.6 sec., and thus the amount of adsorbent required is reduced to about 1/50 making the system compact and reducing the cost of equipment. In the prior art, the valves themselves control the pressure, and it has been difficult to shorten the period of a cycle for speeding the operation up because of economical problems associated with the durability of the valves. In contrast to the prior art, since the pressure is controlled by the cylinder 2 and piston 3, which are more durable than valves, it is now possible to shorten the period of a cycle in the present embodiment.

Also, though not described in the above embodiment, the valves 17 in FIG. 2 can be replaced by a system in which a piston itself acts also as a valve.

INDUSTRIAL APPLICABILITY

The present invention described above offers a gas mixture separator utilizing pressure modulation that makes possible great reductions in the power required for operation and in the cost of equipment.

We claim:

1. In a gas mixture separator utilizing pressure modulation wherein pressure in at least two cylinders is modulated by a reciprocating piston in each cylinder, each piston dividing the respective cylinder into an upper chamber and a lower chamber, an adsorbent with pressure dependent adsorbtivity disposed in said upper chamber at each cylinder between the respective piston and cylinder head, an inlet connected to each cylinder for process gas to be separated, and an outlet connected to each cylinder for unadsorbed gas between the adsorbent and cylinder head, the improvement comprising:

second outlet connected to each cylinder for desorbed gas disposed between the piston and adsorbent of each cylinder;

a second inlet for each cylinder connected to the lower chamber thereof;

a passage means connecting said second outlet of one cylinder to said second inlet of another of the cylinders for transferring desorbed gas therebetween; and means means for reciprocating said pistons out of phase with respect to each other so that during the forward stroke of the piston toward the adsorbent in said one cylinder desorbed gas in said upper chamber of said one cylinder passes through said outlet thereof, through said passage means and through said inlet of said another cylinder.

2. A gas mixture separator as claimed in claim 1 and further comprising:
   a third outlet connected to the lower chamber of each cylinder for desorbed gas in said lower chamber.

3. A separator as claimed in claim 1 wherein said means for reciprocating said pistons comprises a common crank shaft connected to said pistons of the respective cylinders.

4. A gas mixture separator as claimed in claim 3 and further comprising:
   a third outlet connected to the lower chamber of each cylinder for desorbed gas in said lower chamber.

* * * * *